United States Patent
Knighten

(10) Patent No.: US 6,561,238 B2
(45) Date of Patent: May 13, 2003

(54) MENU-DRIVEN, CONFIGURABLE DOOR PROCESSING STATION

(75) Inventor: Charles A. Knighten, Chico, CA (US)

(73) Assignee: Norfield Industries, Chico, CA (US)

( * ) Notice: Subject to any disclaimer, the term of this patent is extended or adjusted under 35 U.S.C. 154(b) by 0 days.

(21) Appl. No.: 09/976,644

(22) Filed: Oct. 11, 2001

(65) Prior Publication Data

US 2002/0043293 A1 Apr. 18, 2002

Related U.S. Application Data

(60) Provisional application No. 60/240,374, filed on Oct. 13, 2000.

(51) Int. Cl.[7] .............................................. B23Q 15/00
(52) U.S. Cl. ..................... 144/385; 29/26 A; 144/2.1; 144/3.1; 144/27; 144/357; 144/367; 144/382; 144/424; 144/218; 144/240; 144/365; 408/12; 408/26; 408/49; 402/216; 700/160; 700/167
(58) Field of Search ...................... 144/2.1, 3.1, 27, 144/329, 365, 367, 356, 357, 382, 424, 385, 218, 240, 353; 408/12, 26, 49; 29/26 A; 409/201, 216; 700/159, 160, 167, 180, 181

(56) References Cited

U.S. PATENT DOCUMENTS 3,263,723 A * 8/1966 Sheffield et al. ............. 144/353
4,485,857 A * 12/1984 Norlie et al. ................. 144/3.1

* cited by examiner

Primary Examiner—W. Donald Bray
(74) Attorney, Agent, or Firm—Townsend and Townsend and Crew LLP

(57) ABSTRACT

A door preparation station includes a data processing control system that drives a display for presenting sequential series of menu selections that illicit operator information that is used as control data to configure the station for preparing a door for receipt of predetermined door hardware (e.g., locks, hinges, etc.) of one type or another. Based upon responses received at the menu selections, the processing system positions and operates various door preparation cutting and drilling elements for the door preparation procedure.

6 Claims, 15 Drawing Sheets

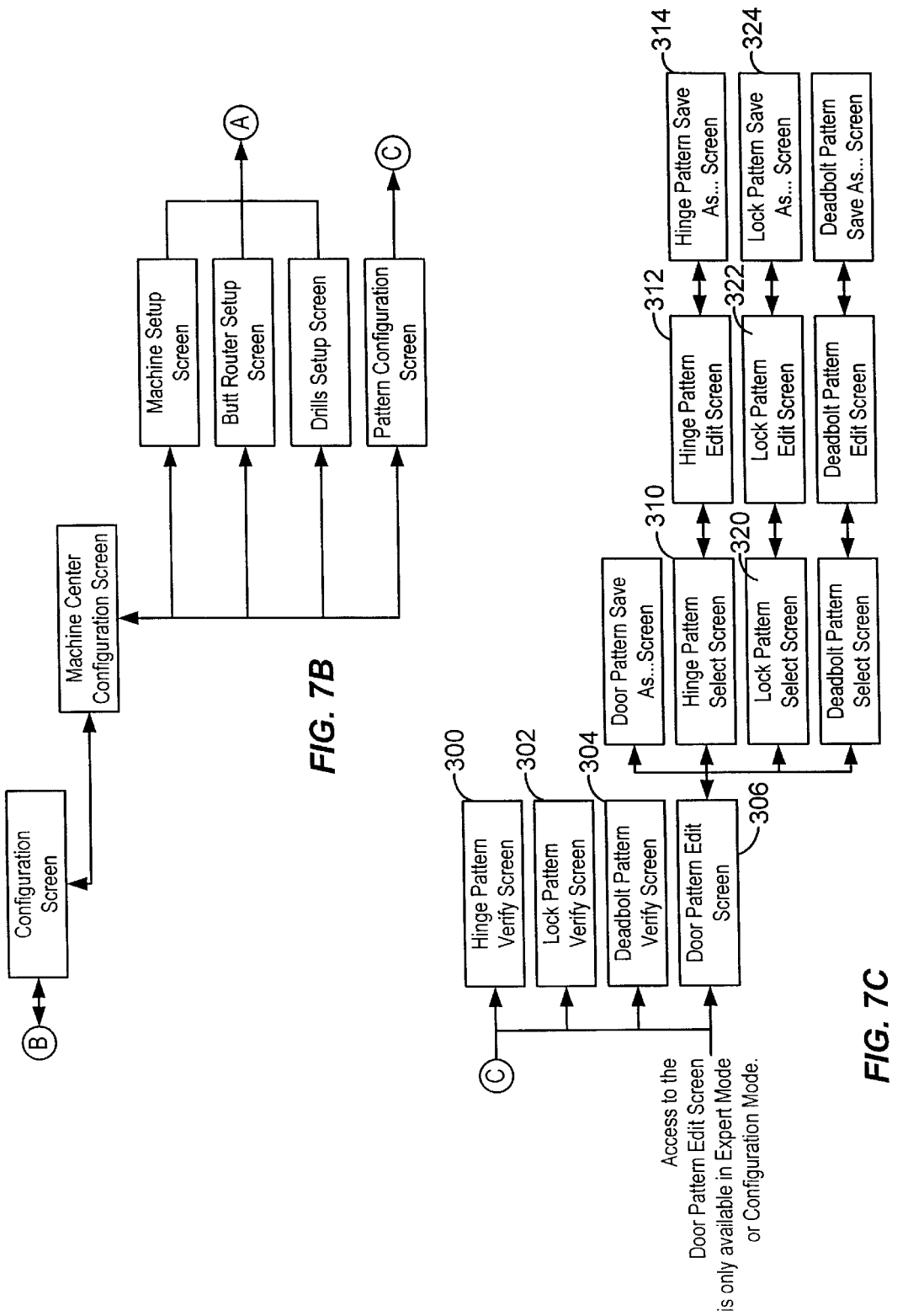

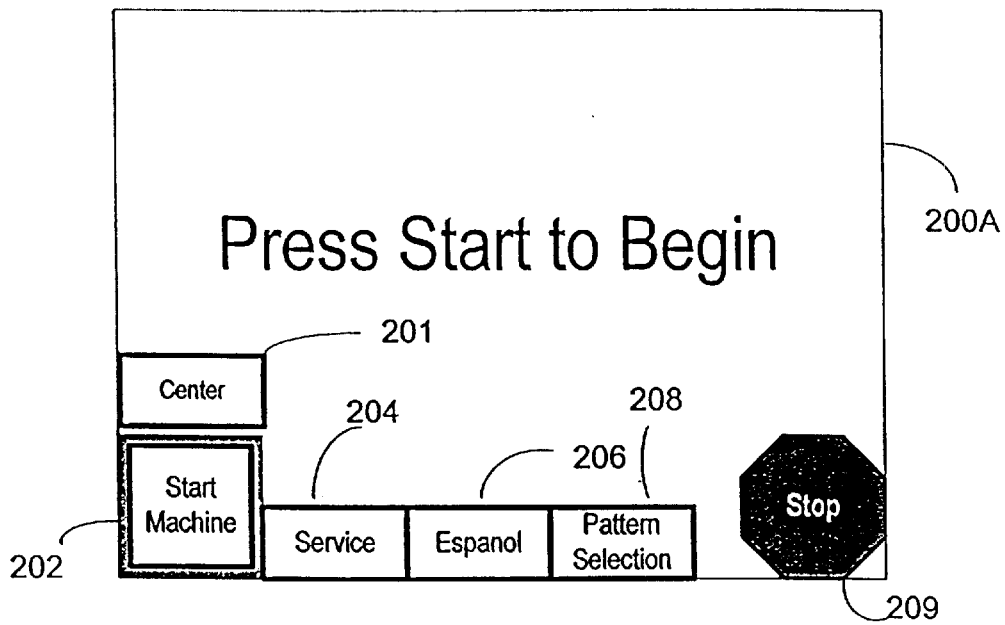
FIG_8
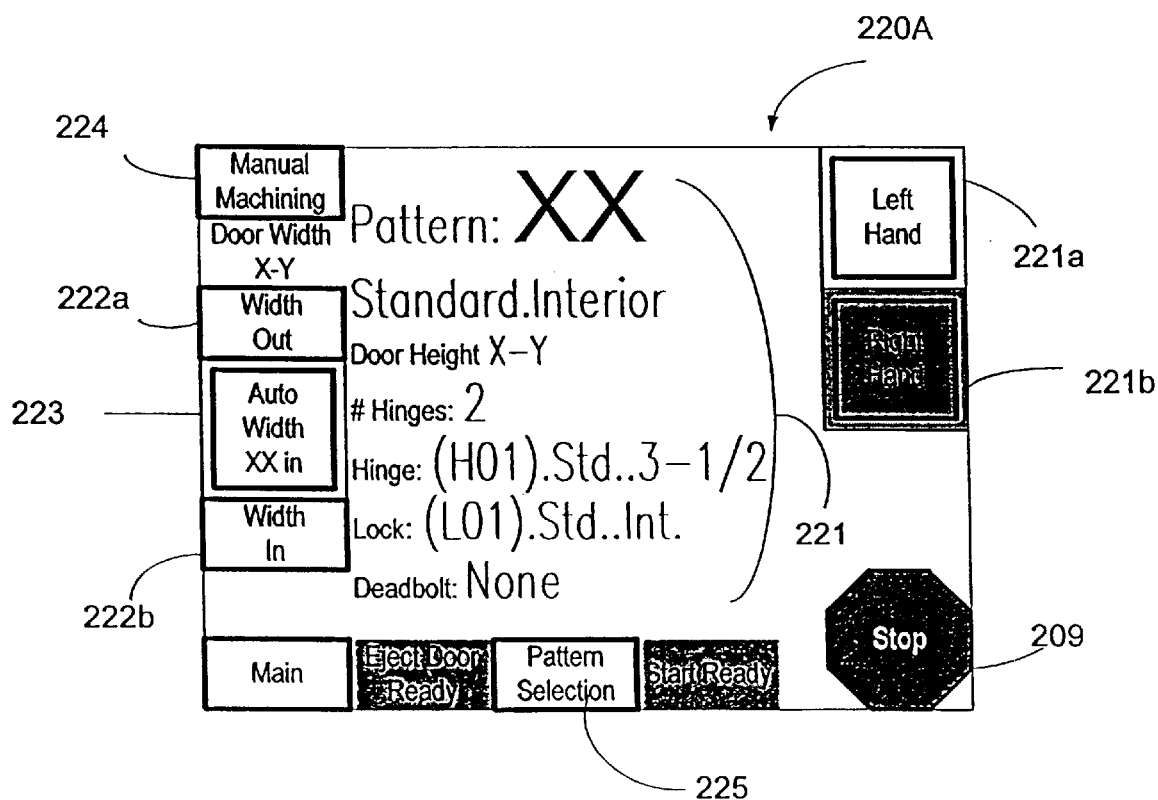
FIG_9

PATTERN SELECT SCREEN
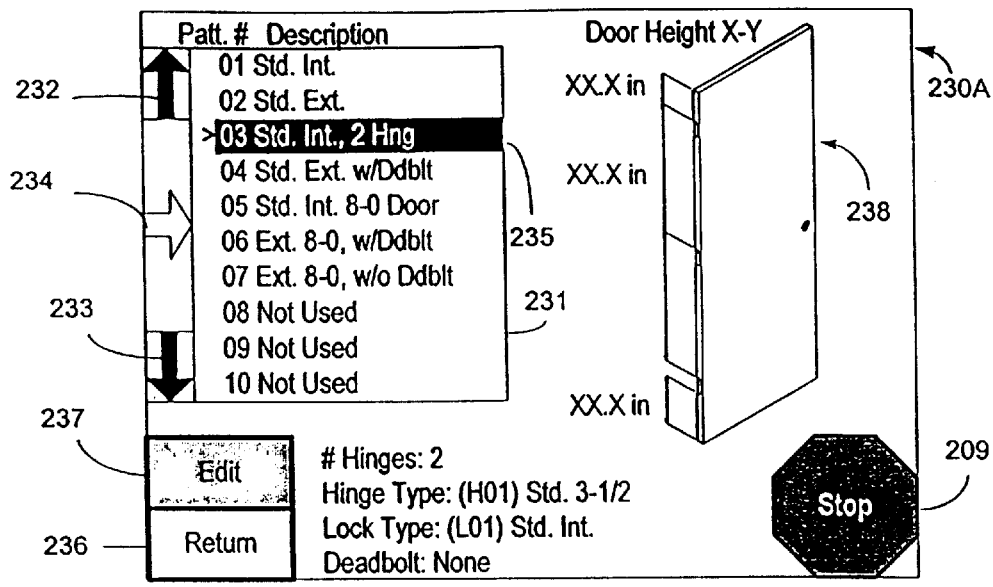
FIG_10
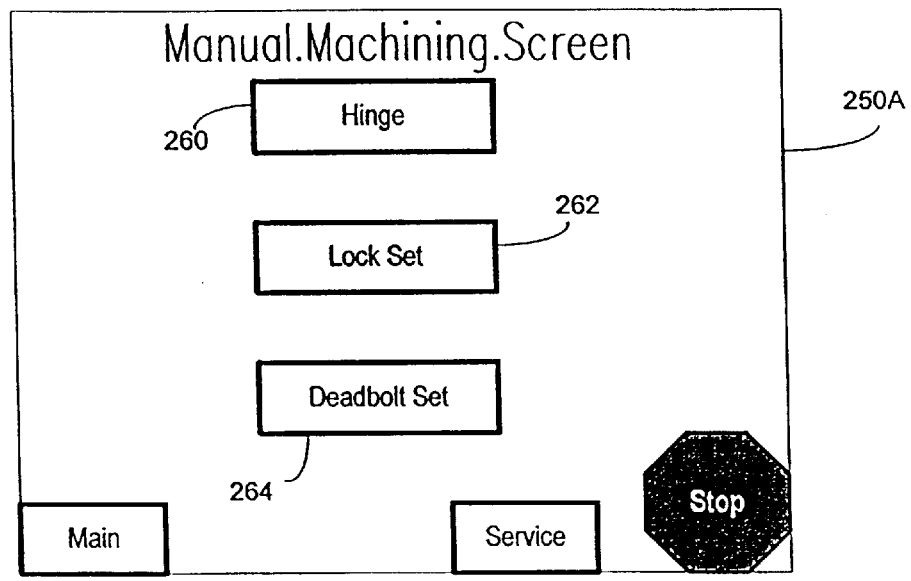
FIG_11

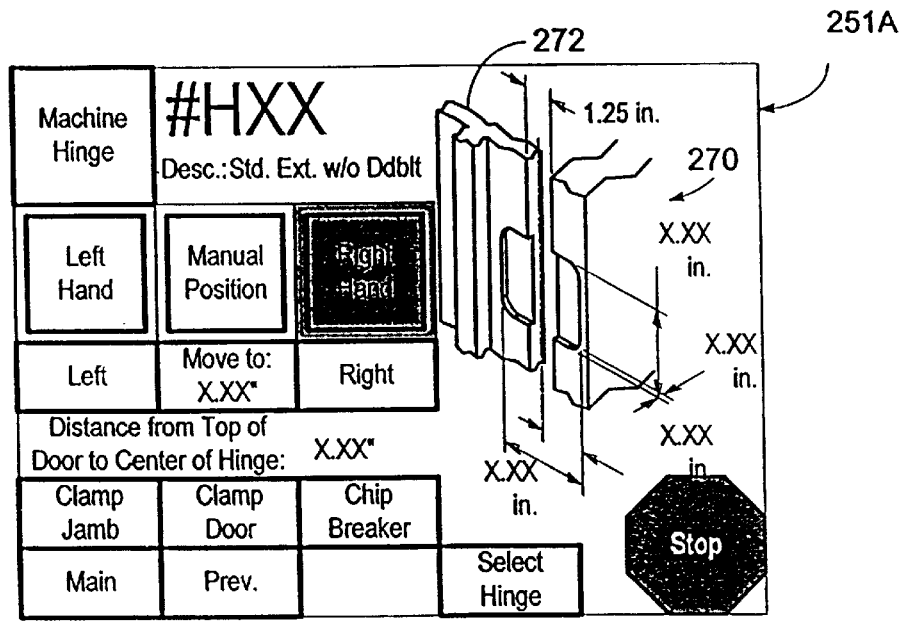
FIG_11A
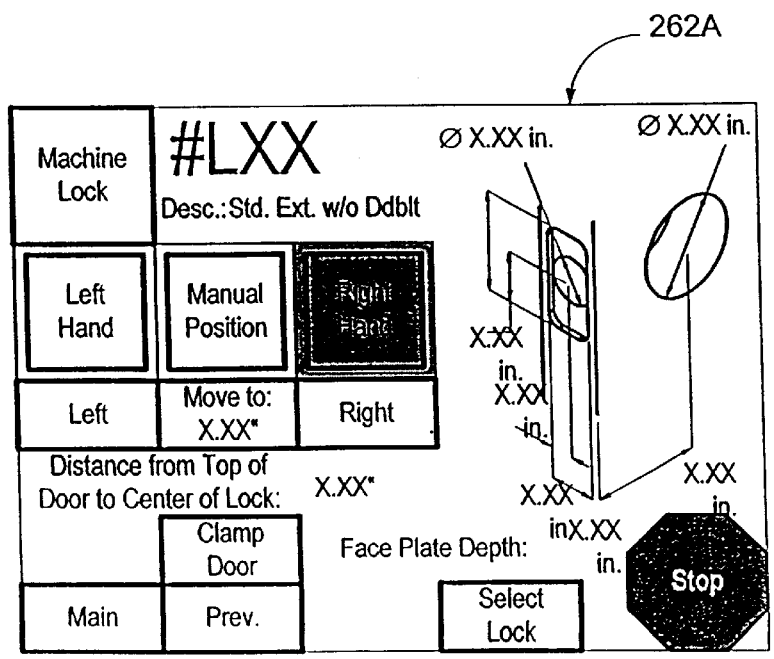
FIG_11B

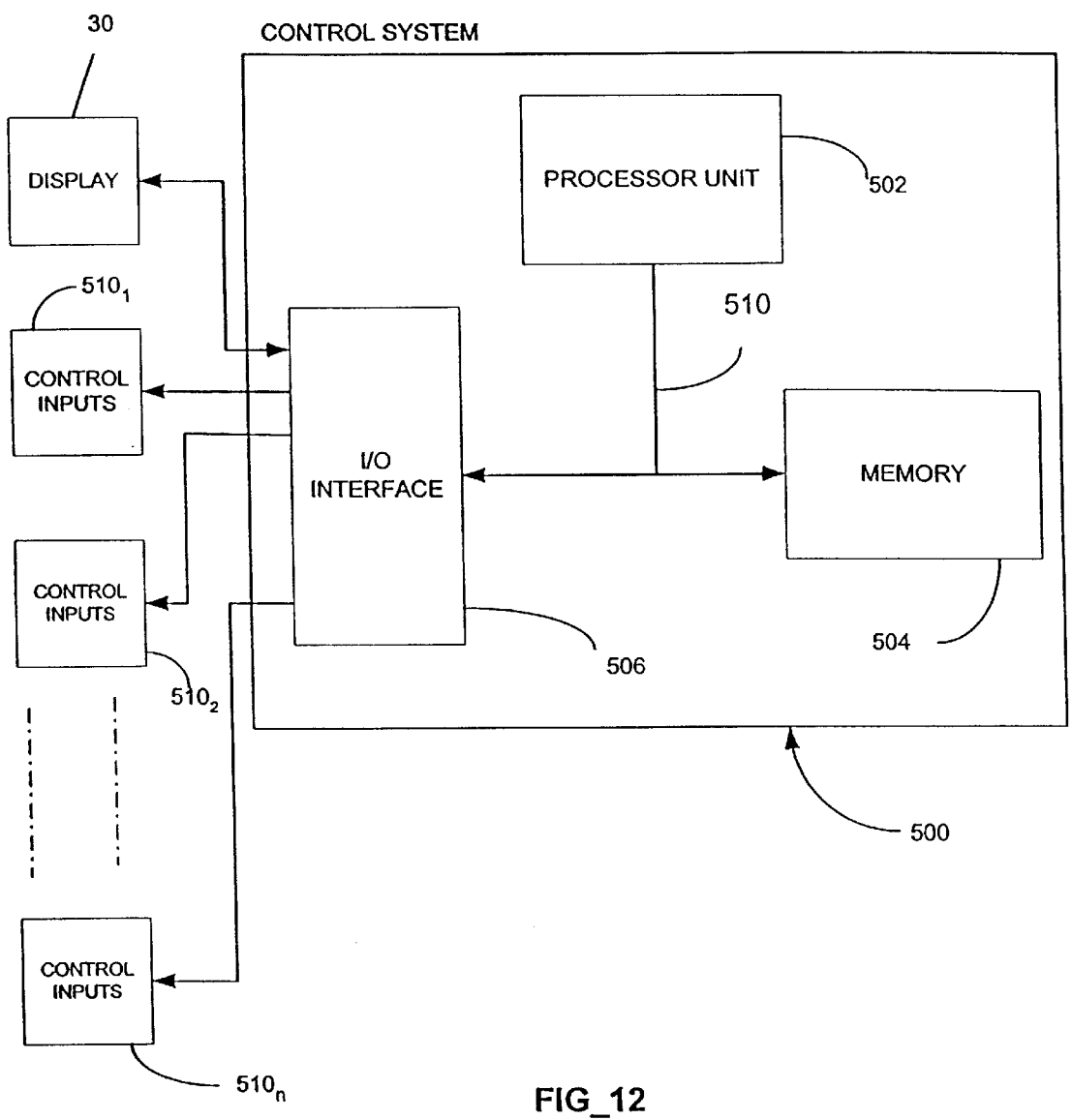
FIG_12

MENU-DRIVEN, CONFIGURABLE DOOR PROCESSING STATION

CROSS-REFERENCES TO RELATED APPLICATIONS

This application claims priority from co-pending U.S. Provisional Patent Application No. 60/240,374 filed on Oct. 13, 2000, the disclosure of which is incorporated herein in its entirety for all purposes.

BACKGROUND OF THE INVENTION

The present invention relates generally to automated machinery and more particularly to automated door processing equipment for preparation of pre-hung doors.

The invention pertains to the construction industry where it has long been found expedient to limit manufacture of component parts of a structure under construction. For that reason, doors, windows, cabinets and similar component parts of a building are often delivered to the construction site in various states of completion to be finished according to requirements then prevailing for the particular job.

Doors are one example of such prefabricated components, and it just so happens one to which the present invention pertains. Doors are often manufactured for delivery to a construction site in various pre-prepared states, sizes, and "handedness." ("Handedness" refers to the edges of a door at which the hinge and door locks for the door are installed). A builder may require several different sizes and types of doors for a single house or building being constructed. Some doors will need to have the necessary lock and/or latch hole drilling at one door edge and the hinge routing for door at the other so that the door "hardware" (e.g., locks, latches, hinges, etc.) can be located to allow the door to open away to the right. Conversely, other doors may be need that open away to the left, necessitating an alternate placement of door hardware. Door hardware for a right-opening door will need to be installed on edges opposite to that for a left-opening door. (Hardware installation may either be at the construction site or by the manufacturer.) And, to perhaps make matters worse, hinge and faceplate patterns can be different, each likely requiring mortises with dimensions different from the others.

Doors that are manufactured for delivery to a construction site are usually referred to as "pre-hung," and most often comprise three basic components: the door, a head jamb or header (the horizontal part of the door frame above the door), and two side jambs, the hinge jamb and the strike jamb. Pre-hanging a door will include forming the various mortises and holes in a door blank and its associated side jambs for the hinges, face plates, door locks, etc. that will used with the door, and then assembling these components. (Alternatively, the door components may be prepared, but not assembled, and shipped in their unassembled state for assembly elsewhere. Known as "knock-down" units, unassembled doors still require preparation for accepting the requisite door hardware.)

The manufacture of pre-hung doors or knock-down units (hereinafter, cumulatively referred to as pre-hung doors) can be labor intensive due to the variety shapes and sizes of doors and the hardware added to them. For example, interior doors will usually have two hinges whereas an exterior door will often have three hinges. Thus, a door for interior use will need to be prepare to accept two hinges, while an exterior door will be prepared for three hinges.

To reduce costs, the door manufacturing industry has resorted to automation wherever possible in order to reduce many of the labor-intensive aspects of door manufacture, providing automated workstations at which the various door preparation activities can take place. An example of an automated door preparation system can be found in U.S. Pat. No. 4,254,895.

However, even though the use of automated equipment available today can reduce the cost door prefabrication is still costly and labor-intensive. And, use of much of the present automated equipment requires trained individuals, again raising the cost. Even though automated, if the type, style, or size of door changes, the equipment must either be reset for the particular door to be drilled/routed for pre-hanging, or if the equipment cannot be reset to work on doors of a particular type, size, etc. the doors must be prepared by another piece of equipment or manually.

Thus, it is evident that the preparation of doors to ready them for the addition of hinges, locks, and other door hardware still needs further automation to be able to have one piece of equipment for handling doors of many different sizes and styles.

SUMMARY OF THE INVENTION

The present invention is a versatile door preparation station that provides a menu-driven selection of door processing parameters, allowing doors of a wide variety of configurations (i.e., length, width, and thickness) to be pre-hung and prepared for acceptance of a broad range of door hardware. Mortising for hinges and face plates, drilling for locks and dead bolts are easily defined and changed through a series of menus that lead one through the various parameters.

Broadly, the invention is directed to a door preparation station with a data processing-control for presenting sequences of menus that are arranged to guide one through parameter selection to configuration and set various machining elements for door preparation operation. A control console provides an interactive display through a touch-sensitive display to provide an operator the ability to select, create, or modify the door machining elements (drills, routing elements, etc.) of the door preparation station. Thereby, the station is preset to receive and prepare doors of one size for pre-hanging. If doors of another size, style, and/or requiring different hardware are to be prepared for pre-hanging, an operator, again through the control console and the guidance provided by the sequences of menus available, can re-program the station for a different set of door specifications.

One aspect of the invention provides a tiltable section of the door preparation machine that allows joint preparation of an edge of a door and its associated jamb for non-beveled door edges (i.e., edges which form a 90 degree angle with the front and back of the door) and beveled door edges. The tiltable section carries the jamb for the door, positioning it proximate the edge of the door to which the jamb will be attached (by the hinges). This allows the hinge mortises to be simultaneously formed in the door and the jamb. In addition, when the tiltable section is pivoted, the jamb goes with it, so that the hinge mortises can still be formed in the jamb and (beveled) door edge flush with both.

BRIEF DESCRIPTION OF THE DRAWINGS

FIGS. 7A–7C are flow diagrams illustrating the progression from one display screen to another as shown on the control console of the door preparation station of FIG. 1;

FIG. 8 is a representation of the main screen from which operation of the door processing station of FIG. 1 is initiated;

FIG. 9 is an illustration of the main operator screen as presented on the control console of the door processing station of FIG. 1;

FIG. 10 is an illustration of the door pattern selection screen displayed on the control console of the door preparation station of FIG. 1, to configure the machine;

FIGS. 11, 11A–11B are representations of control screens that provide control selections for manual operation of selected elements of the door preparation station of FIG. 1. and FIG. 12 is a block diagram, broadly illustrating the data processing control system of the invention.

DESCRIPTION OF THE SPECIFIC EMBODIMENTS

Figure 1:
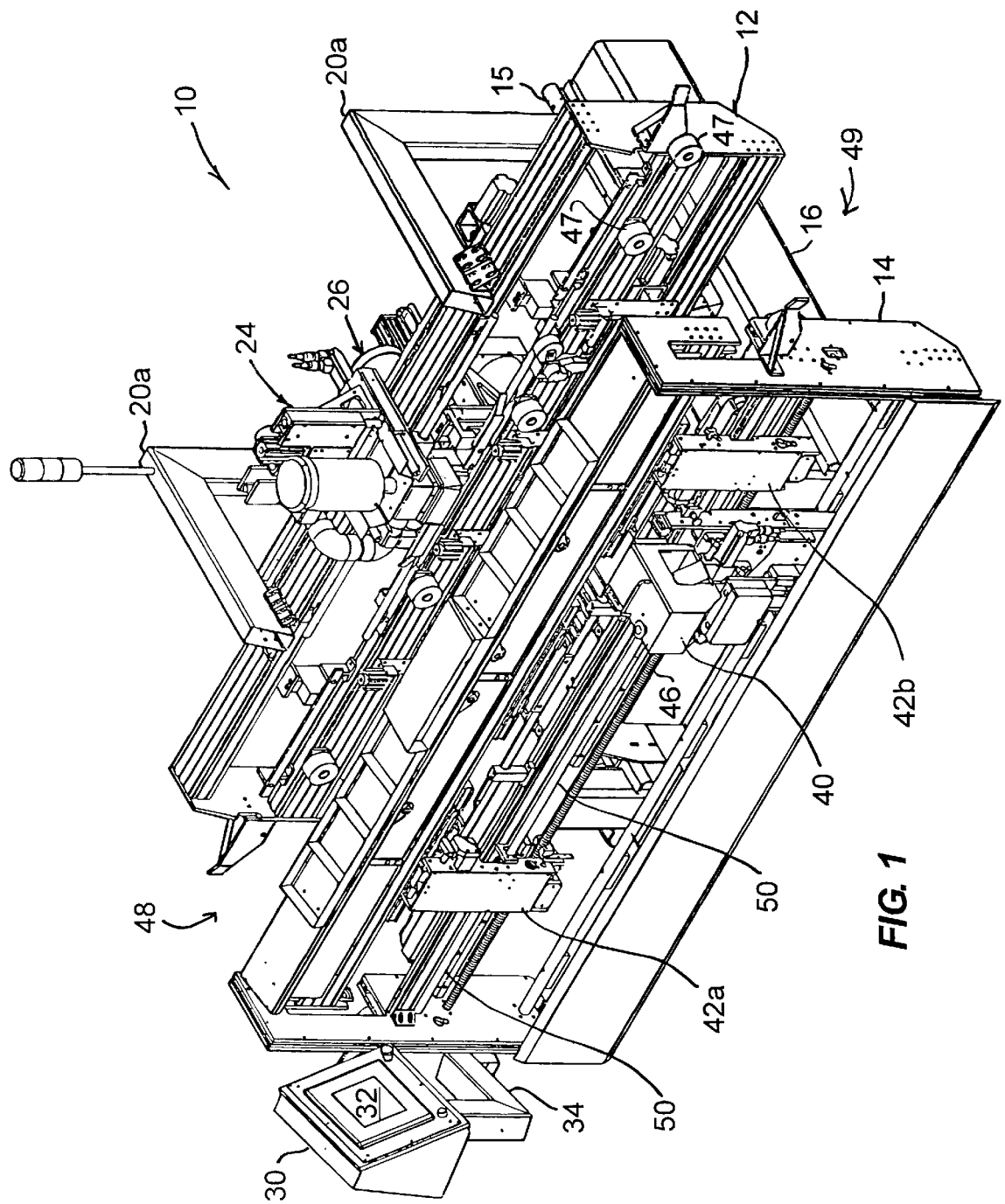
FIG. 1 is a perspective view of the door preparing station of the present invention.

Turning now to the figures, and for the moment specifically FIG. 1, there is illustrated a door preparation station identified by the reference numeral 10. The door preparation station 10 (hereinafter "station") is shown as including two support assemblies that carry the working elements of the station 10: a movable assembly 12 and a pivot assembly 14. The movable assembly 12 is constructed so that it can be moved on a rail 15 that is mounted to a base member 16. Movement of the movable assembly 12 is lateral, toward and away from the pivot assembly 14, allowing acceptance and accommodation by the station 10 of doors of different widths. Movable assembly 12 includes a pair of weldments 20a and 20b that provide support and structural integrity for mounting various of the door working elements (described below) and positioning mechanisms that position a door relating to these elements.

As FIG. 1 shows, the movable assembly 12 carries a face machining module 24 (illustrated in greater detail in FIG. 6), which operates to drill lock holes, area door knobs, and the like in door blanks. Also carried by the moveable assembly 12 is an edge machining module 26 (see also FIG. 5), which operates to drill latch bores and mortises in a door edge. Finally, a width index drive assemble (not shown) is carried by the movable assembly 12 that operates to move the movable assembly 12 along the track 15 toward and away from the pivot assembly 14 for positioning the two assemblies to accept doors of a particular width, as well as for indexing a door (positioning it) for preparation in a working position.

Configuration control of the door preparation station 10 is made possible by a operator's control console 30 with a display screen 32. Sequences of menu are presented on the display screen 30, under managed by a data processing control system (FIG. 12) to allow an operator to set the operating parameters of the door preparation station 10 according to the specifications of the doors to be prepared for pre-hanging. As FIG. 1 illustrates, the control console 30 is affixed to the station 10 by a swivel arm 34, allowing the control console to be positioned for easy use.

The control console 30 houses microprocessor-based data processing system capable of being programmed to be in command of the working functions of the operating elements of the station 10. As will be seen, the control console 30 will present sequences of menus that establish an interactive colloquy with the operator, guiding the operator through a setup process that can preset the station 10 to receive and prepare a door (and associated jamb). Operator responses and input during this colloquy will provide the necessary information to allow positioning of the various door preparation elements of the stations 10 according to the particular size and type of the door, the door hardware and style that will be installed, the placement of that hardware, and such other parameters. For example, the station 10 can be configured to prepare a pre-hung door of a particular size that opens right (i.e., with a hinge-edge bevel) and is hung using three hinges (as opposed to two). After completing work on the first door, the control console 30 can again be used to reconfigure the station 10 for preparation of a second pre-hung door that may be of a different size, opens left, has two hinges, and will take different door latch hardware than that the previous door.

Continuing with FIG. 1, among the various operating elements of the station 10 is a butt router module 40 (shown in greater detail in FIG. 4) and a pair of indexing assemblies 42 (42a, 42b) that are carried by the pivot assembly 14. The butt router module 40 is structured to be movable along the pivot assembly 14 by a powered nut-threaded bar combination of generally conventional construction. The powered nut (not shown) is contained by the butt router module 40 and is threaded on an elongate threaded bar 46. Depending upon the direction of rotation of the powered nut (not shown), it will move the butt router module in one direction or the other along the threaded bar 46 and the pivot assembly 14. This allows the butt router module 40 to be moved to the necessary positions along a door edge for forming the mortises for hinge plates.

Doors enter the door preparation station 10 at an infeed end 48, and exit, when finished, from the outfeed side 49. Doors are preferably sequentially presented to the door preparation station 10 at the infeed side 48 by a conventional feed mechanism, but doors may also be introduced manually. Doors presented to the station 10 are drawn into position for working by a conveyer belt (not shown) carried by the pivot assembly 14. The movable assembly 12 has rollers 47 that assist in moving the door into position. Doors brought into the station 10 by the conveyor belt (not shown) of the pivot assembly 14 are halted by a stop on the index assembly 42b. Proximity sensors mounted in the index assembly 42b determine if the door is in proper position for working. If not, the conveyor belt will drive the door a little beyond the stop, back it up, and relocate it against the stop of the index assembly 42b in an effort to achieve the desired positioning.

As mentioned above, and as will be seen further below, the door preparation station 10 is capable of preparing doors for pre-hanging that swing either right or left. This means that the door preparation station must be capable of performing the necessary hinge plate routing on the hinge edge of doors that are double beveled (i.e., those doors that are not only beveled on the lock side or edge, but also have a bevel on the hinge edge). To be able to position the working tool (in this case the butt router module 40) at an appropriate angle for hinge-edge beveled doors, the pivot assembly 14 is capable of pivoting about a lower pivot bar 50. This pivoting action allows the butt router module 40 to be positioned to form mortises door edge that is believed, and later reposition the butt router module for mortise formation on doors that are not beveled.

Figure 2:
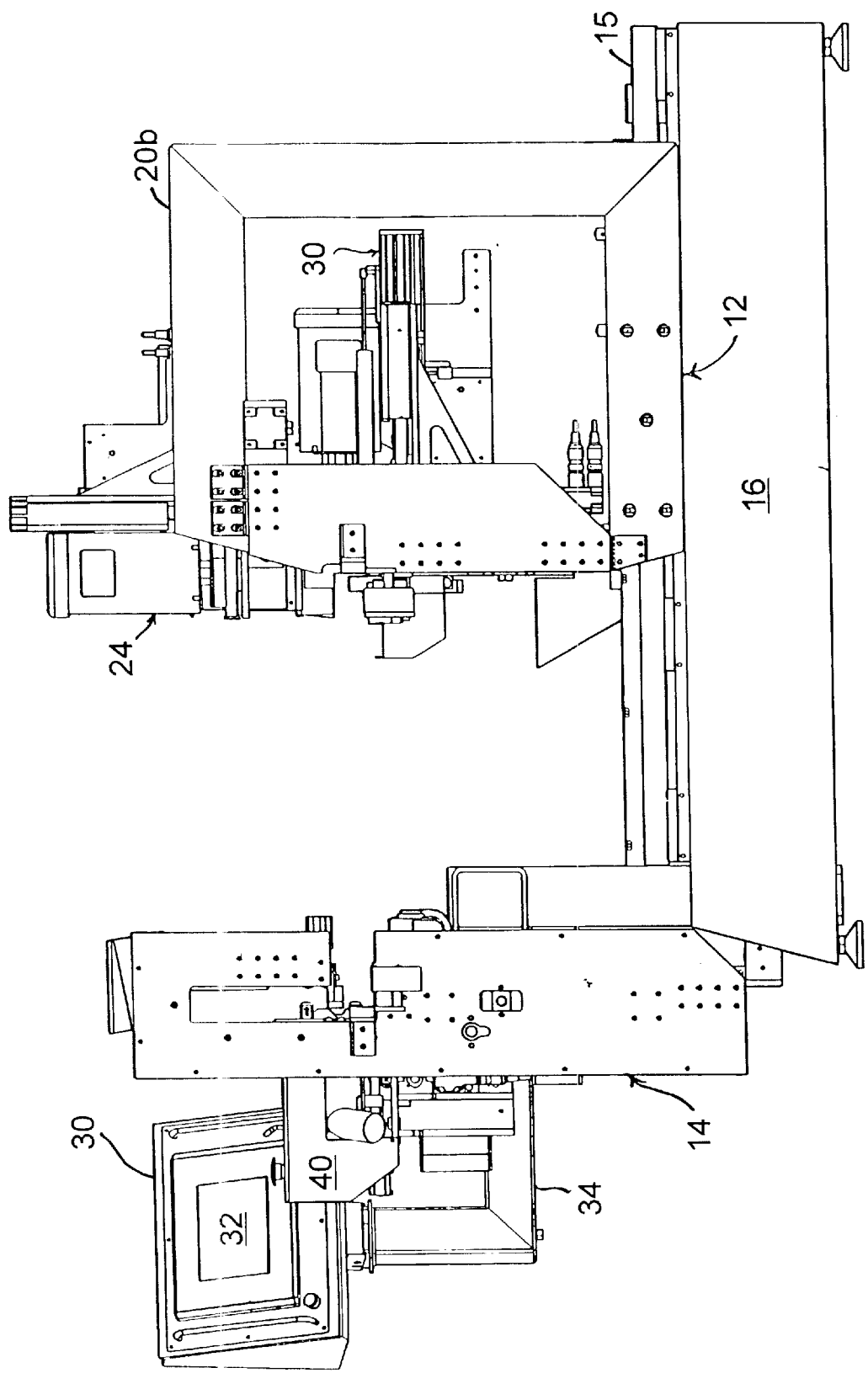
FIG. 2 is a view of the outfeed side of the door preparing station of FIG. 1.
Figure 2A:
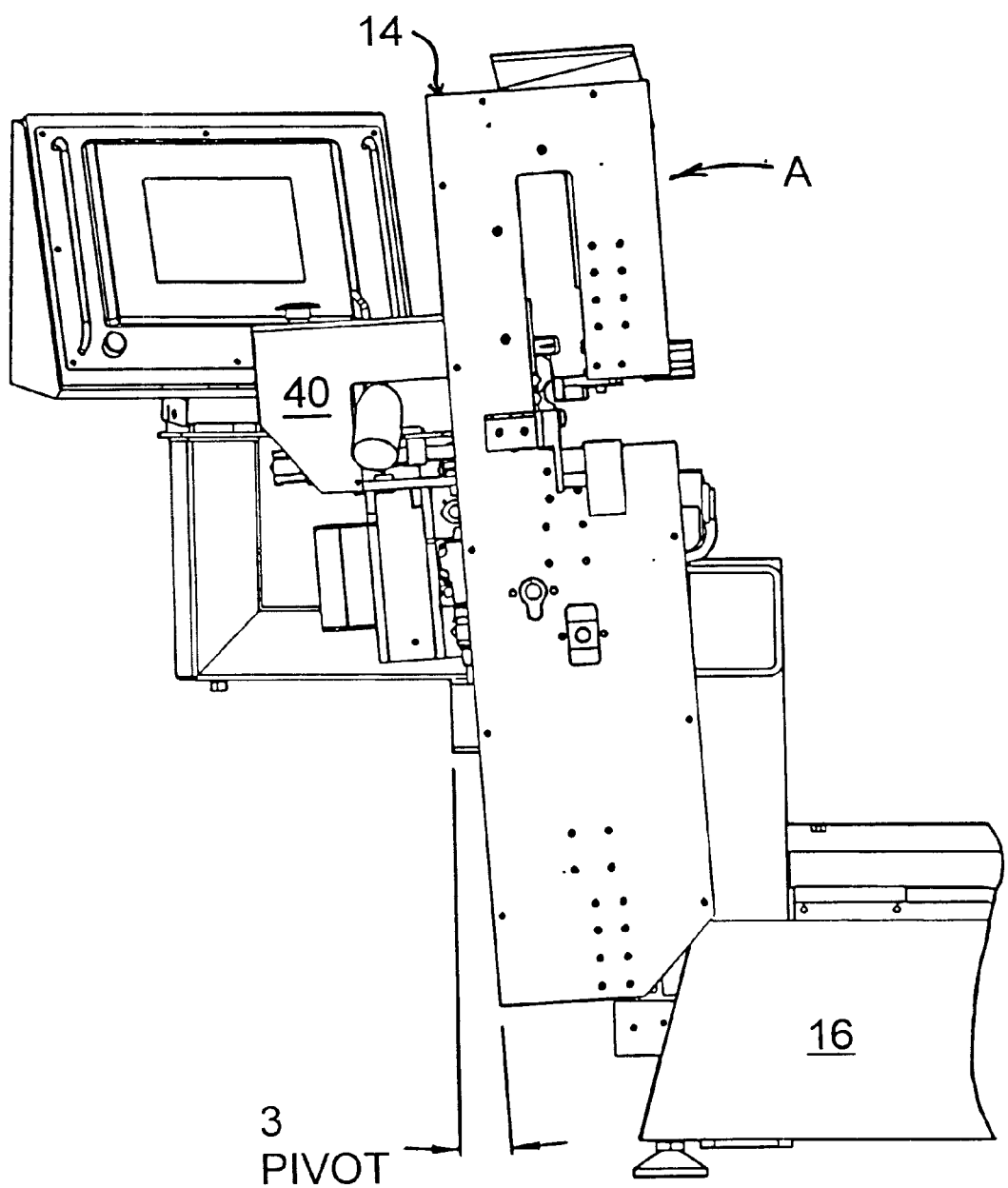
FIG. 2A is a view of the outfeed side of the pivot assembly showing it in a pivoted position.

FIG. 2 illustrates the pivot assembly 14, viewed toward the outfeed side 49, in its upright, non-pivoted position for hinge mortising. However, for forming mortise pockets to receive a hinge plates flush with a beveled hinge-edge of the door, the pivot assembly 14 is pivoted (typically, for most bevels, approximately 3 degrees) about the pivot bar 50 (FIG. 1) to position it as shown it FIG. 2A. This re-positions the butt router assembly 40 for work on the beveled edge of the door.

Figure 3A:
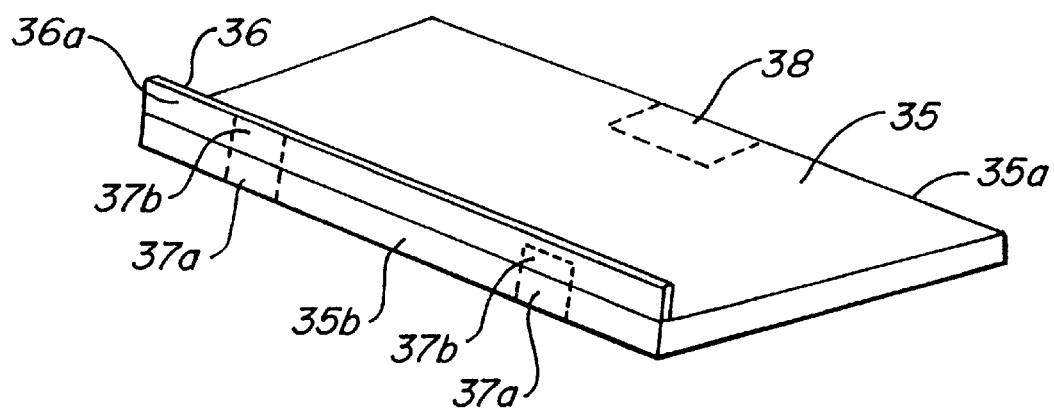
FIGS. 3A and 3B illustrated the edge of a door held in the door preparing station of FIG. 1 and the jamb to which the door will be attached, in non-pivoted and pivoted door positions, respectively.
Figure 3B:
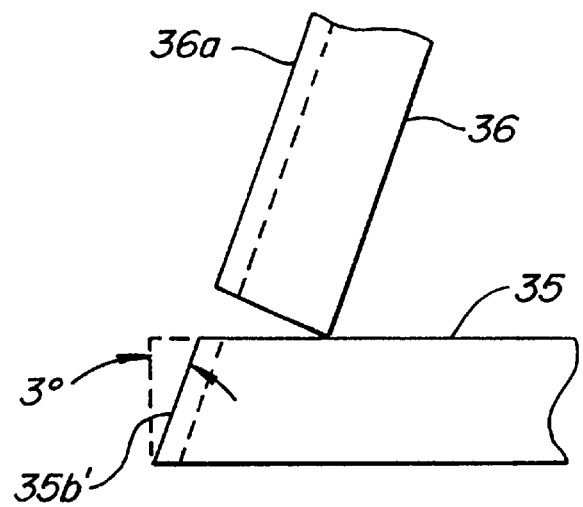

The ability to tilt the router assembly 40 and the associated jamb for hinge mortising door edges that are beveled is an important feature of the invention, and therefore is more particularly explained with respect to FIG. 3. FIG. 3A illustrated the positioning of a door 35 and the jamb 36 to which the door 35 will be attached. Latch bores and pockets for receiving whatever latching mechanism the door will use will be formed, for example, on the edge 35a of the door, for example at 38. Hinge pockets will be formed in the edge 35b of the door, for example at 37a. The jamb 36 to which the door 35 will be attached will also have hinge pockets formed at 37b to match those formed in the door 35.

Since the hinge pockets formed in both the door edge and its associated jamb will be formed at substantially the same locations along their lengths, it makes sense to construct them together to save time. Thus, when the door 35 is brought into the door preparation station 10, its associated jamb 36 will be manually inserted in a holder on the pivot assembly 12, positioning the jamb to that its hinge surface 36a is coplanar with the hinge edge 35b of the door 35 as illustrated in FIG. 3A. The butt router module 40 can then be positioned at the each of the hinge locations 37a/37b and the hinge pockets of the door edge 35b and the jamb surface 36a formed together.

But, suppose the door edge 35b is beveled? This can occur of a batch of doors are to be double-beveled, i.e., beveled on both edges, cut down inventory. Such doors can be used as both left-opening or right-opening doors, rather than having to inventory doors with a bevel for left-opening, and another inventory beveled for right-opening. Thus, the router module is pivoted relative to the door by pivoting the pivot assembly 12 as illustrated in FIG. 2B. Since the jamb 36 is held by the pivot assembly, it to is pivoted to the position illustrated in FIG. 3B, positioning the hinge surface 36 of the jamb 36 coplanar with the surface of the hinge edge 35b of the door. Once again, the now re-positioned butt router assembly 40 can form the hinge pockets in both the edge 35a and the hinge surface 36a of the jamb 36 flush in both and at the same time. Then, if at some later date doors having a hinge edge 35b with no bevel are to be pre-hung, the pivot assembly 12 is pivoted back to its upright position illustrated in FIG. 2A, placing the butt router assembly 40 so that it can form hinge pockets flush in non-beveled edges. At the same time the associated jamb 36 is positioned with the hinge surface coplanar with the non-beveled door edge 35a.

Figure 4:
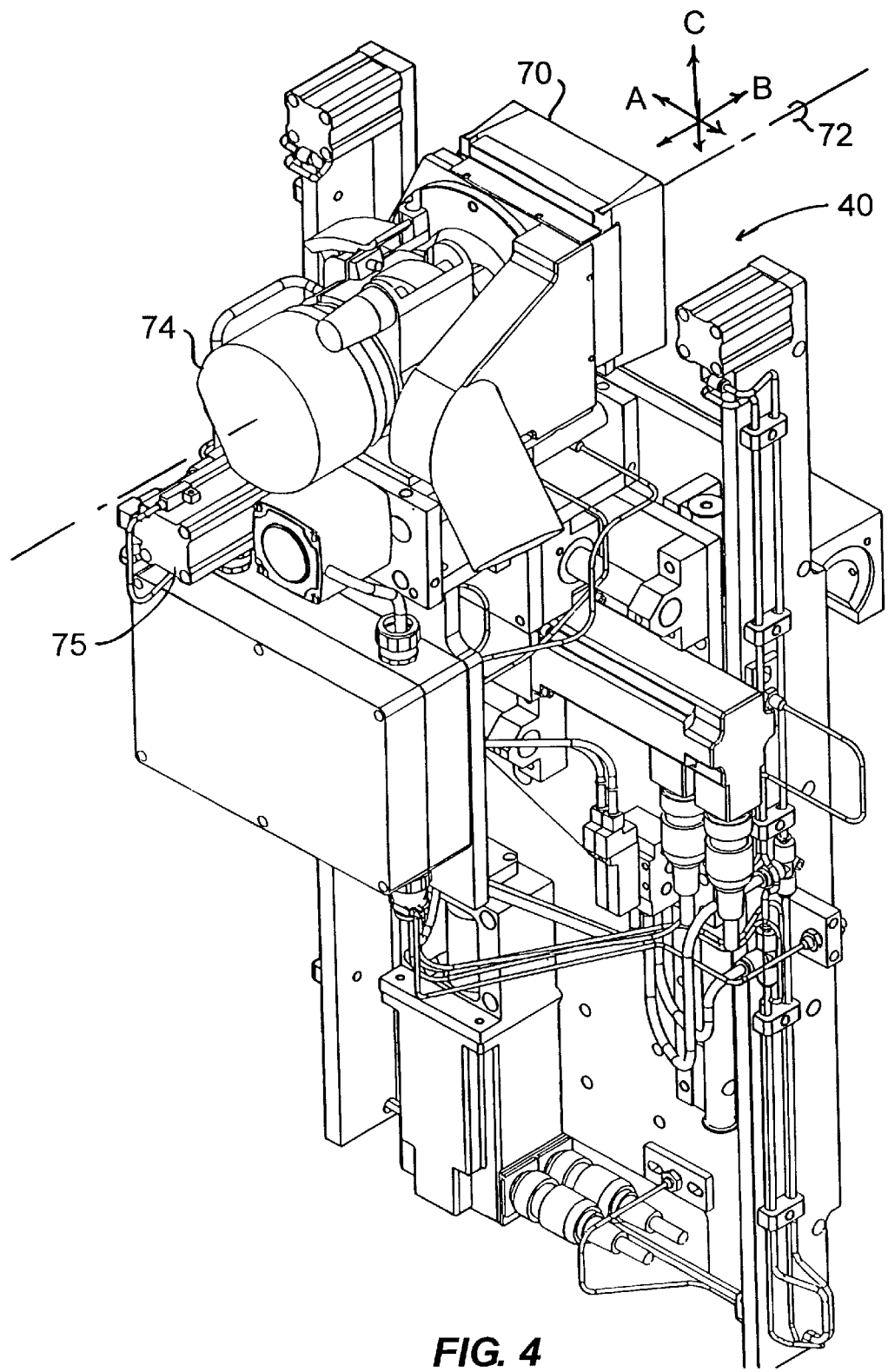
FIG. 4 is a perspective view of the butt router module forming a part of the preparation station of FIG. 1.

Turning now to FIG. 4, illustrated in greater detail is the butt router assembly 40. The cutting tool (not shown), which is powered by an electric motor 74, is covered by a dust hood 70 that works with a vacuum assembly to carry away cuttings that are produced by the cutting action of the cutting tool. The butt router assembly is structured to provide the cutting tool with three degrees of freedom, all presettable. The first dimension is movement along the hinge edge of a door, made possible by the powered n threaded bar 46 combination (FIG. 1) described above. The cutting tool and its driving force, electric motor 74, are movable in the remaining two dimensions: (1) along the axis 72, toward and away from hinge edge of a door, made possible by a pneumatic system that includes pneumatic cylinder 75, and (2) transverse the hinge edge of a door, up and down, driven by a conventional servo system (not shown). The plunge depth of the cutting tool can be preset, through the control console 30, for the particular depth needed to form the hinge plate mortises. Arrows A, B and C indicate these dimensional freedoms of the cutting tool. The cutting tool used by the butt router assembly 40 is substantially similar to that (discussed below) used by the face and edge machining modules 24.

The fact that the cutting tool of the butt router assembly 40 is capable of three degrees of freedom is an important feature. The ability to move with three degrees of freedom permits the cutting tool to cut mortises of different shapes and depths. By circularly rotating the cutting tool of, for example, the face and edge machining modules 24, 26 (which, as will be seen, also have three degrees of freedom) as they cut the lock and latch holes, respectively, the sizes of the holes can be changed for the particular hardware to be us without having to change the cutting tools.

Figure 5:
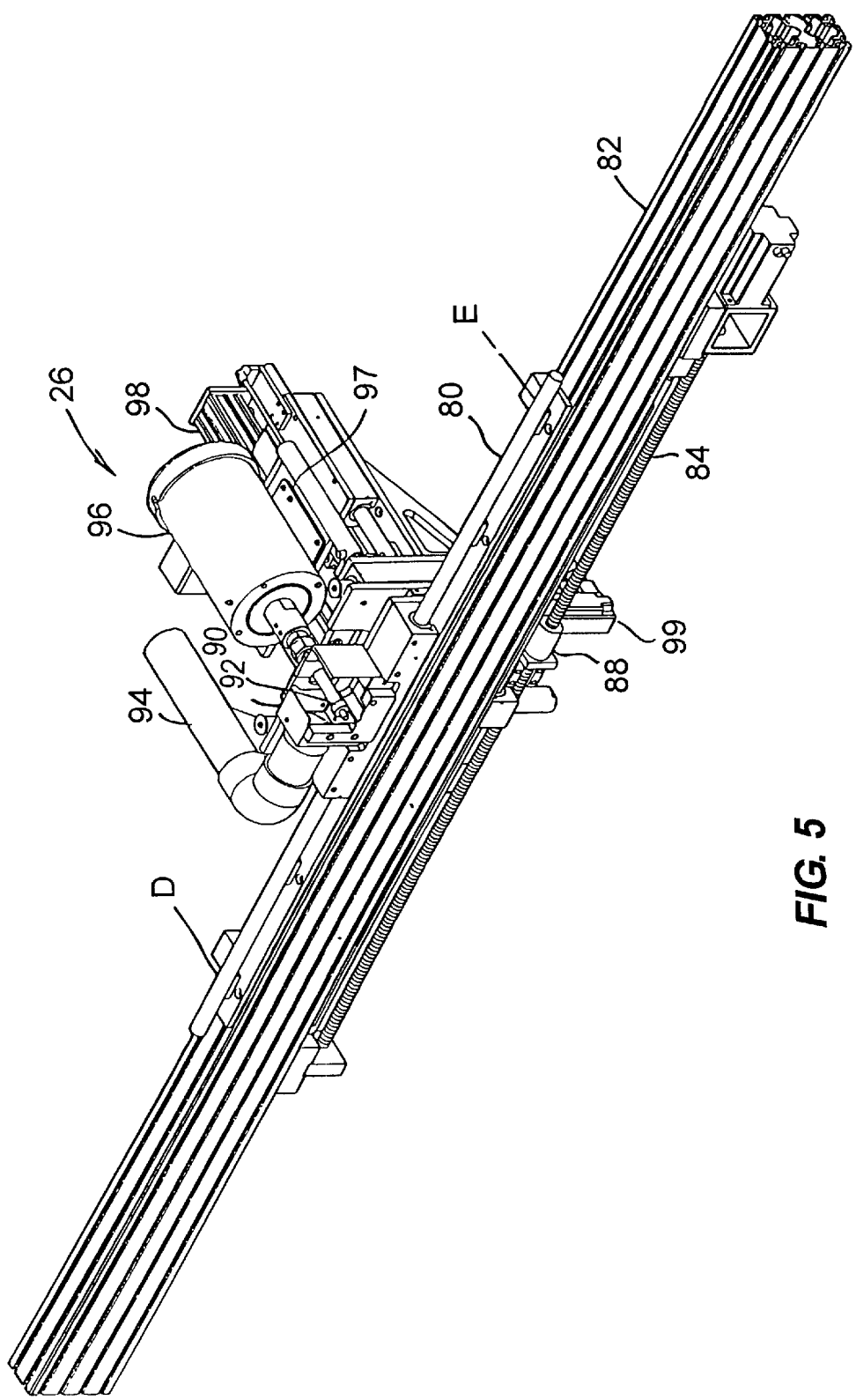
FIG. 5 is a perspective view of the edge machining module used in the door preparation station of FIG. 1, showing the dust collection parts cut away to illustrate the cutting tool.

Turning now to FIG. 5, the edge machining module 26 is illustrated in greater detail. As FIG. 5 shows, the edge machining module 26 is connects to a guide bar 80 which, in turn, is mounted to cross-member 82 of the movable member 12 (FIG. 1). Beneath the cross-member 82 is mounted a rotatable, threaded shaft 84. A fixed nut 88 is mounted on the threaded shaft 84 and is connected to the edge machining module to provide the edge machining module with the motive force for freedom of movement between points D and E. Rotating the threaded shaft 84 will position the edge machining module 26 along a door edge for edge and face machining (e.g., drill the latch and lock bores) and latch plate mortise formation.

The cutting member 90 of the edge machining module 26 is housed in dust collection hood 92 (shown partially cut away to expose the cutting member 90 for viewing) that is connected to a source of vacuum by dust evacuation conduit 94. The cutting member 90 is powered by an electric motor 96 that is mounted to sit on a movable platform 97. The shaft 84-nut 88 combination The motor 96 is movable in three dimensions: an air cylinder 98 operates to move the motor 96 in a first dimension toward and away from a door edge, a servo motor 99 operates to move the motor 96 up and down (i.e., transverse a door edge), and the threaded shaft/fixed nut 84/88 operated to move the motor in a third direction, along the edge of a door. The plunge depth into a door can be preset and controlled from the control console 30, and is controlled by an electronic stop that senses when the cutting member 90 reaches the desired (preset) depth.

Figure 5A:
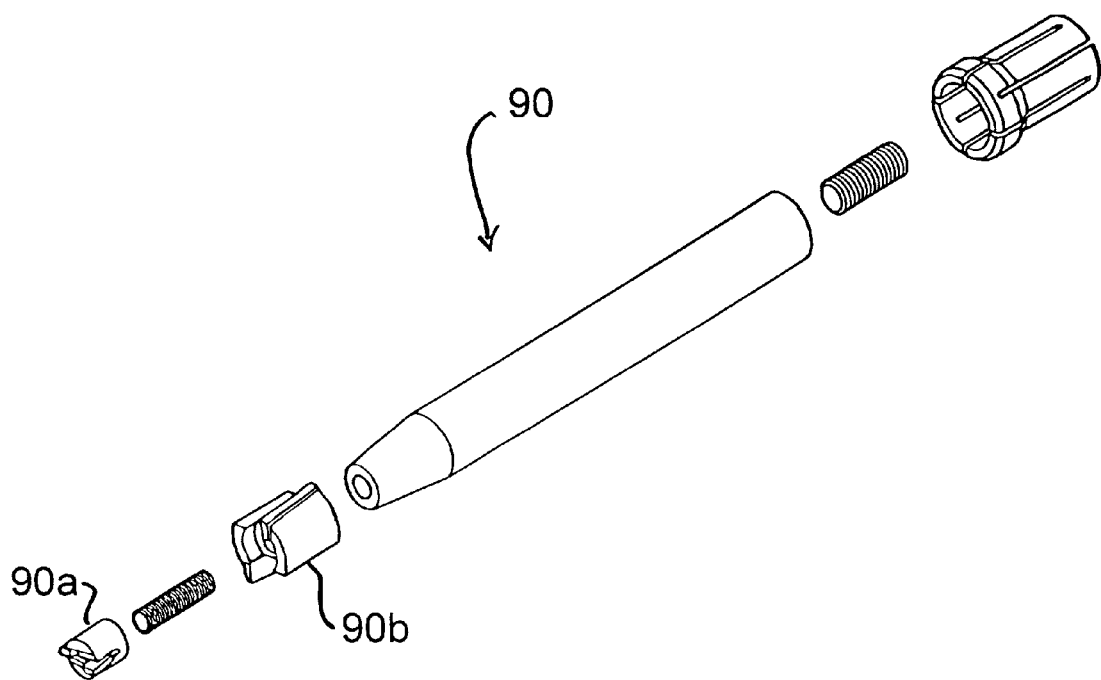
FIG. 5A illustrates the cutting tool used by the edge machining module in greater detail.

FIG. 5A is a better view of the cutting member 90 used by the edge machining module 26, illustrating in particular the two cutting surfaces 90a and 90b. The cutting surface 90a is formed to cut into an edge of a door, and is used for forming latch pockets. For latch pocket formation, controlled movement of the air cylinder 98 (by the processing system) will initiate longitudinal travel of the cutting member 90 toward the door to thrust the cutting surface 90a into the latch edge of the door to the desired depth, i.e., a depth commensurate with the thickness of the latch plate so that it will be flush with the door's edge when attached. Then, under direction of the data processing control system (pursuant to parameters previously input by a prior operator-control console colloquy), controlled operation of the servo motor 99 and the threaded shaft/fixed nut 84/88 will function to move the cutting surface 90a in a pattern that forms the latch pocket of a desired shape and size. Formation of the lock or latch bore may follow (or precede) the latch/lock pocket formation by placement of the cutting tool 90 at the point that the bore is desired (again, by programmed control of the servo motor 99 and threaded shaft/fixed nut 84/88), and the air cylinder 98 commanded to thrust the cutting tool into the edge of the door for bore formation.

As with the butt router assembly 40, the ability of the edge machining module 26 to be able to move with three degrees of freedom allows just one cutting tool to create a variety of different size and shaped latch plate mortises, lock pockets, and different diameter latch and lock bores. In addition, the edge machining module 26 can be used to machine latch/lock pockets at any reasonable position along a door's edge, as well as being able to form the lock/latch plate mortises.

Figure 6:
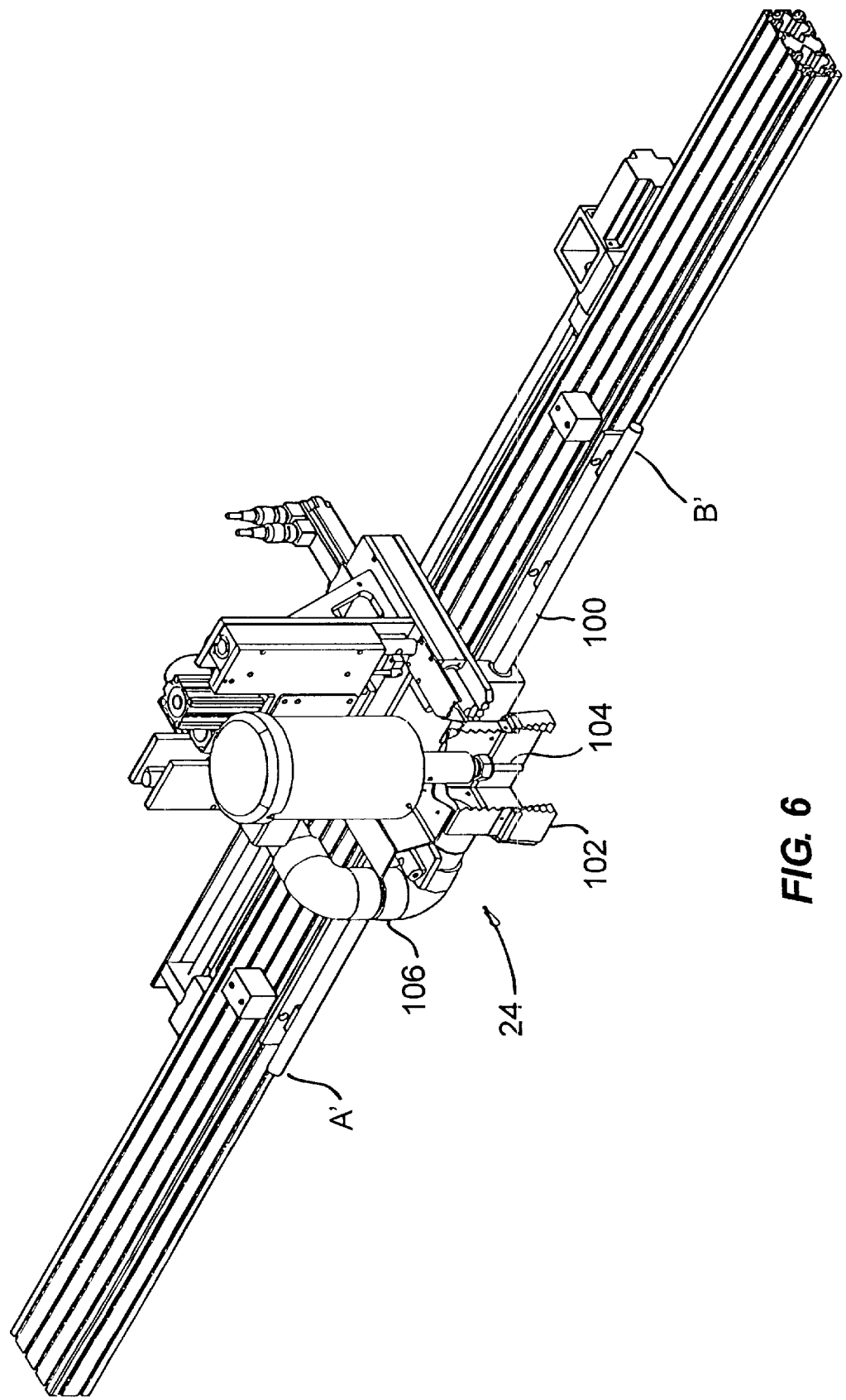
FIG. 6 is a perspective view of the face machining module that forms a part of the door preparation station of FIG. 1, with the dust collection hood cut away to show the cutting tool.
Figure 6A:
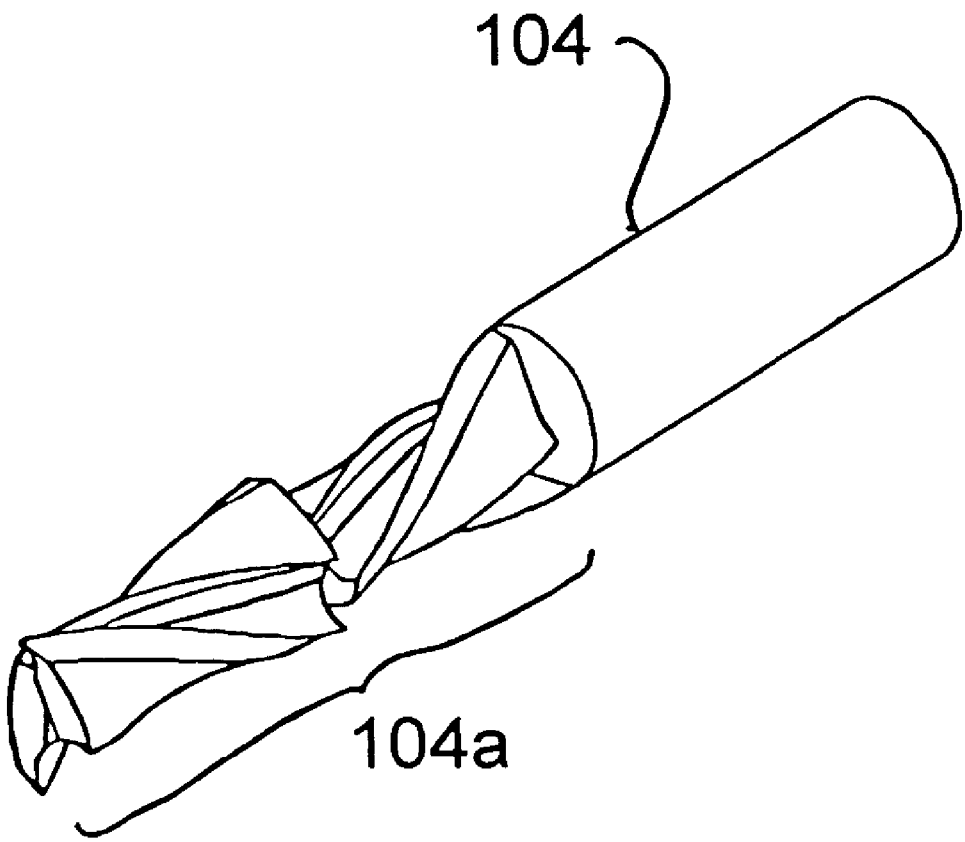
FIG. 6A illustrates the cutting tool of the face machining module in greater detail.

FIG. 6 is an illustration of the face machining module 24 used to carve mortises in a door face surface for receiving latch, lock, and/or door knob hardware. Like the edge machining module 26, the face machining module 24 is also movable along a guide bar 100 between points D' and E'—along the length of the door. The motive force for face machining module 24 movement is provided by a nut/threaded screw arrangement (not shown) similar to that used for the edge machining module 26 (FIG. 5) and the butt router assembly 40 (FIG. 4). A dust cover 102 (shown cut away) encloses a cutting member 104 for carrying capturing debris created by the operation of the cutting member that is carried away by the conduit 106. The face machining module 24 is provided with a combination of servo mechanisms and pneumatic elements that operate to give the cutting element 104 three degrees of movement: one along its length (toward and away from the door) for drilling operations, and two in a plane perpendicular to its length for creating mortises in a door face. In addition, lock holes diameters are presettable to any desired dimension (within reason).

FIG. 6B illustrates the cutting member 104 in greater detail. As FIG. 6B shows, the cutting member 104 includes a compression spiral router cutter section 104a formed using, for example, a ¾ inch shank, although those skilled in this art will realize that other diameter shanks may be used.

As has been indicated, guidance of the cutting elements of the face machining module 24, edge machining module 26, and butt router assembly 40 is under control of the data processing control system (FIG. 12). As will be discussed in greater detail below, the control system will receive the necessary parameters that guide, position, and control operation and movement of the various servo systems (e.g., servo motor 99), threaded bar/nut combinations (e.g., threaded bar-nut combination 84, 88), or pneumatic systems (e.g., pneumatic cylinder 74) for performing the cutting and routing operations a door during the pre-hanging process.

Shown in FIG. 12 is a simplified block diagram that representatively illustrates a data processing control system for control and operation of the station 10. As FIG. 12 shows, the data processing control system, designated with the reference numeral 500, comprising a processor unit 502 and associated memory 504, an input/output (I/O) interface 506, and a multi-bit system bus structure 510 that communicatively intercouples the processor unit 502, memory 504, and I/O interface 508 to one another. The I/O interface 506, in turn, is coupled to the display unit 32 of the console 30 and to control inputs $512_1$, . . . , $512_n$ of various of the motors, servo motors, pneumatic cylinders, and the like of the station 10 to thereto supply the control signals developed by the processor unit 502 for operation. For example, signals would be communicated from the processor unit 502 to the I/O interface by the system bus 510, which in turn supplies those signals to the control inputs 512 of the electric motor 74, pneumatic cylinder 75, and associated servo system of the butt router module 40 (FIG. 4). Those signals, would then operate to initiate such activity as causing the electric motor 74 to begin rotating the cutting tool (not shown tin FIG. 4), and to move that cutting tool in the three available dimensions A, B, C for forming mortises in a door blank that will receive hinge plates.

The control system 500 operates, in response to the parameters supplied it by an operator, to control the machining elements (e.g., the face machining module 24, the edge machining 26, and the butt router assembly 40) of the station 10 to position them relative to a door blank, and guide their cutting operation. Doors, and their associated doorjambs, can differ in their pre-hanging preparation. One set of doors may require two hinges, positioned differently form another set of doors, and with lock and latch apparatus also different from other doors. Accordingly, the operator information input allows the control system 500 to develop the necessary data, and from that the data signals, to accurately position the various cutting tools of the stations machining elements, and to operate them for performing the hinge mortise, lock and latch hole boring, and other cutting operations that prepare a door and its associated jamb for pre-hanging. Once the information is input, no further input is needed until doors requiring something different are to be prepared by the station 10.

Figure 7A:
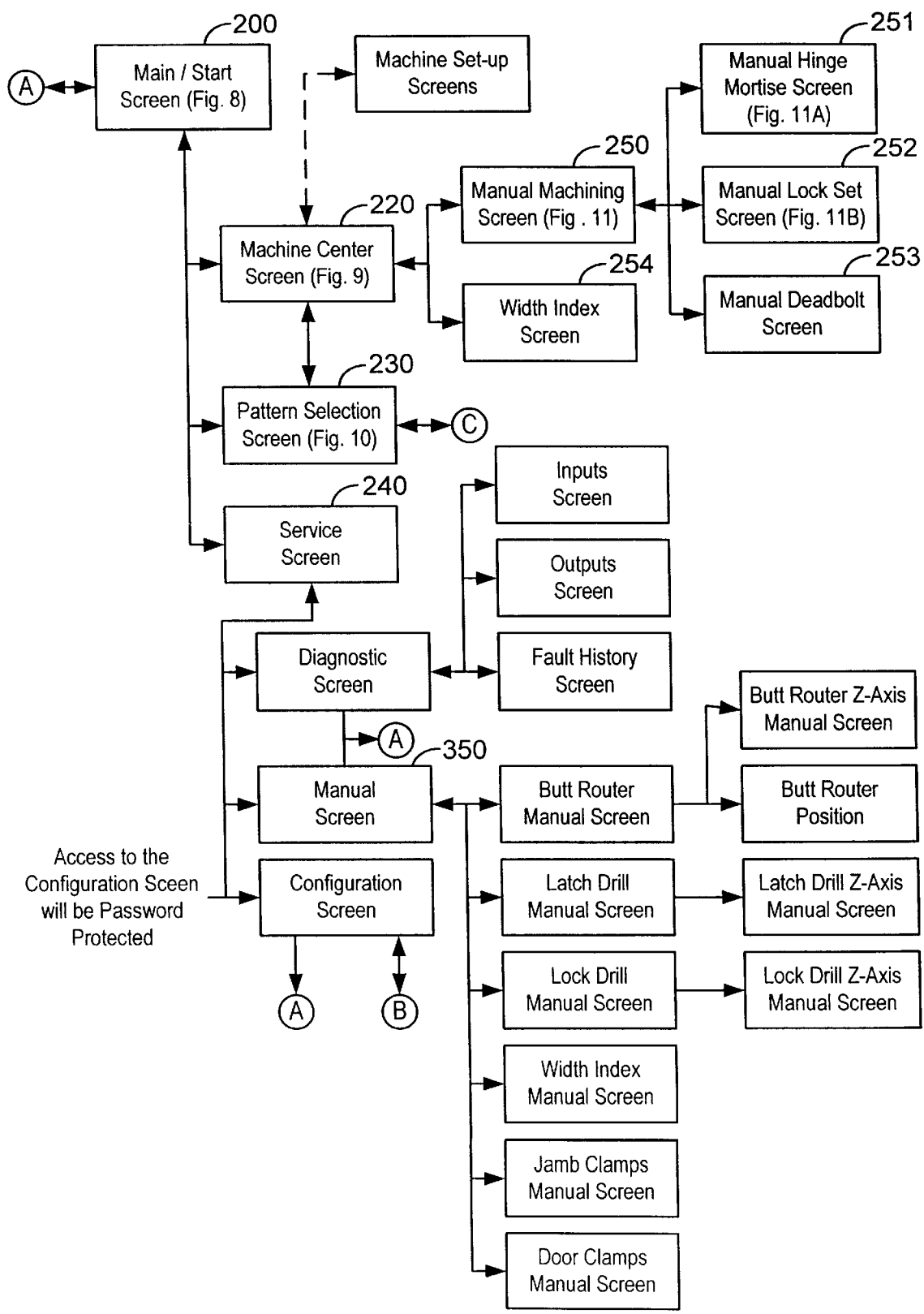

The door preparation information needed by the control system 500 is obtained through the control console 30 (FIG. 1), employing a convention touch sensitive screen for operator input. The control system 500 operates to sequentially present menu selections on the display screen 32, each having menu choices that illicit operator input providing the needed information or guide an operator through further menu sequences illicit that information. Each menu of a sequence is based upon the selections and decisions entered by the operator at prior menus of the sequence. FIGS. 7A–7C are flow diagrams that illustrate the steps of sequential flow of the various menu screens based upon prior selections made by an operator.

The flow diagrams of FIG. 7 show the different paths or menu sequences that are available for selecting and setting various parameters while leaving other parameters with their earlier preset values (if earlier preset). One may, through the guidance of the menu sequences chosen at the control console 30, set all parameters, or just some parameters, leaving others as they were previously set, For example, at the outset one may need to set such parameters as the size, depth, shape, location, and number of hinge mortises to be fashioned in the hinge edge of a door. In turn, this will require input of the information necessary for programmed operation of the butt router assembly 40 in order to employ it in formation of hinge mortises. Similarly, the necessary informational parameters for programmed operation of the face machining module 26 may be input in order to allow it to locate and create drill lock holes, area door knobs, and the like in door blanks; and/or parameters necessary for guided operation of the edge machining module 26 to drill latch bores and mortises at proper locations in a door edge may also need to be entered. In addition, one may also need to set the width index drive assemble (not shown) to properly move and position the movable assembly 12 (FIG. 1) relative to the pivot assembly 14 for accepting doors of a particular width, as well as for indexing a door (positioning it) for preparation in a working position so that the face machining module 24, the edge machining 26, and the butt router assembly 40 can find the proper locations on the door blank to perform their respective operations. All or any of these parameters are may be provided by an operator, using touch-screen input of the menu sequences.

FIG. 7A illustrates the main menu sequence selection steps, each step corresponding to a menu screen, that are entered in response to operator input through earlier made selections via menu screens presented on the display screen 30. Any input operation will usually begin with the "Main/Start" menu screen 200A (FIG. 8), brought up by the menu selection step 200. Selection step 200 is entered when the station 10 is first powered up, and is the step that is be returned to when an input and configuration (or re-configuration) process is completed. As FIG. 7A illustrates, selections made on the Main/Start menu screen 200A will lead to one of three selection steps: step 220, which will lead to a series of menus, beginning with a Machine Center Screen (FIG. 9) that gathers information for setting and operating the machining elements (e.g., edge and/or butt router machining modules 24, 40); step 230 which leads to a series of menus for information gathering used to select various patterns (FIG. 7C), beginning with a Pattern Selection screen (FIG. 10); or step 240 (corresponding to a Service Screen; not shown).

Selections are made from the Start/Main Screen 200A, or any menu screen, by merely touching or tapping delineated touch-sensitive menu areas presented on the display screen 32. For example, referring to the Main/Start menu screen 200A of FIG. 8, touching or tapping the display screen 32 at the "Center" touch-sensitive menu area 201 will effect an exit of selection step 200 in favor of selection step 220 which, in turn, and the corresponding machine center menu screen 220A (FIG. 9). In similar fashion, the touch-sensitive menu areas 204 and 208 of the Main/Start screen 200A provide the portals to the Pattern Selection and Service Screens selection steps 230 and 240 and their corresponding Pattern Selection or Service menu screens 230A (FIG. 10) and 240A (FIG. 11), respectively.

The touch-sensitive menu area 206 allows selection of another language to be used in the menus, such as Spanish. Thus, the touch-sensitive menu area 206 will toggle between using English language text and Spanish text on the display screen menu presentations. Touch-sensitive menu area 209 will stop operation of the station 10, an option that, as will be seen, is available on all display screens. Finally, when it is felt that the station 10 is properly configured to work on door blanks of a particular size and/or style, the Start touch-sensitive menu area 202 is used to initiate operation.

A configuration or re-configuration operation of the station 10 will begin with an operator making a selection from the menu screen 200A to proceed to one of the selection steps 220 or 230, and the subsequent selection steps they lead to, depending upon what needs to be programmed. For example, re-location of the hinges, door locks or latches, will require changing the information previously entered for the machining elements (e.g., face and butt router modules) either by selections made by one or both of the menu sequences entered through selection steps 220 or 230.

The Machine center selection step 220 presents the menu screen 220A of FIG. 9. As FIG. 9, which includes menu display area 221 to provide information that describes the presently set door pattern (here, a "XX"). Additionally presented in the menu display area is information respecting the number of hinges ("2") of the XX door pattern, the type of hinges that the station 10 will prepare the door for receiving ("Std . . . 3½"), the lock type ("Std . . . Int"), and whether or not it will be prepared for a deadbolt. (The "None" indicates that the station 10 will prepare doors for the XX door pattern with no deadbolt.) The handedness of the door, when prepared, is indicated by one of the highlighted display areas 221a or 221b. (Here, the display area 221b is highlighted, indicating that the station 10 will prepare doors that open right.) Touch-sensitive menu areas 222 allow one to configure the station 10 for wider or narrow doors than that of the preset pattern (XX). If, for a number of doors, the station 10 is preset for an XX door pattern, modified by adjusting or narrower or wider doors, using the menu selections that are provided by selecting touch-sensitive menu areas 222a or 222b, one may return to a default width, i.e., that associated with the XX pattern, through touch-sensitive menu area 223.

Continuing with the menu screen 220A, touch-sensitive menu area 224 provides selection of selection step 250 (FIG. 7A), which in turn will lead to selection steps 251–253, and their associated menu screens, for manual configuration of machining elements of the station 10, or selection step 254 and associated menu screen (not show) that allows an operator to manually set door widths that the station 10 will accept.

Digressing for the moment, it will be readily apparent to those of ordinary skill in this art that the way menu sequences are formed, the information is presented by each of the menus, and the arrangement of that information, is virtually limitless, and can vary according to how one wishes to present the selections needed to preset and configure the station 10 for operation. Accordingly, is will also be evident that the particular menu screens described herein, as well at the sequences used to access those menu screens, are for illustrative purposes only. The main consideration is the use of menus and menu screens to provide a quick and easy way to configure or re-configure station 10 for door preparation operation.

Suppose one wishes, for whatever reason, to change one or another of the door preparation parameters of the XX pattern. To do so, touch-sensitive menu area 224 is used to proceed to selection steps 250–254 and corresponding menu screens. The touch-sensitive menu area will first bring one to the selection step 250 and its corresponding menu screen 250A—illustrated in FIG. 11. The selections made available by the menu screen 250A allow one to modify the hinge characteristics of the door pattern shown in menu screen 220A (FIG. 9), or the lock set, or the deadbolt set. For example, selecting the "Hinge" touch-sensitive area 260 will bring up the menu screen 251A with information that allows one to manually configure door preparation for hinge mortises. As FIG. 11A shows, the menu screen 2451A displays a partial figure 270 of a door and associated jamb 272 with dimensions. Most of the other touch-sensitive menu areas of the menu screen 251A provide a way to change those dimensions. In addition, there is shown the particular pattern (#LXX) for the present hinge configuration, the description of the pattern (Std. Ext. w/o Ddblt), whether the door is a right or left hand door by highlighting the "Right Hand" or "Left Hand" touch-sensitive menu areas.

The Lock Set touch-sensitive menu area 262 will lead to the lock set menu screen 262A (FIG. 11B). As illustrated in FIG. 11B, the menu screen 262A displays information concerning the particular lock bore and mortise that will be formed in a door prepare by the station 10, including an illustration of a portion of a door 280 showing a lock mortise/bore combination with dimensions that can be changed by menu area selections available on the menu screen 262A Returning for the moment to the Main/Start screen 200A shown in FIG. 8, one may proceed to a series of menus that allow for selection of a particular pattern, or creation of a pattern for later use. This is feature is accessed by selecting (touching) the "Pattern Selection" menu area 208 of the Main/Start screen 200A to proceed to the pattern selection step 230 and its associated Pattern Select screen menu screen 230A—shown in FIG. 10. The pattern select screen 230A includes a window 231 which lists available predetermined door preparation patterns. One may select one of the available predetermined patterns for use or to edit a different pattern, or one may create an entirely new pattern. Selection of one of the available predetermined door patterns is made by touching, tapping, or otherwise making finger contact with the up or down arrows 232, 233, respectively, to position a selection arrow 234 adjacent the desired pattern of the window 231. The presently selected pattern is shown highlighted, as at 235, and information concerning the door of the pre-selected pattern is displayed on the Pattern Select screen 23 OA, including the size of the door, the number of hinges it will use (and, therefore, the number of hinge mortises the machine is presently configured to form), the type of lock (which specifies the lock mortises and bores that a door will received with the present door preparation station configuration), etc.

If the present pattern is acceptable, one may return to the Main/Start screen 200A by touching the "Return" menu area 236 of the Pattern Select screen 230A. Alternatively, if one wishes to edit a one of the listed patterns, or create a new pattern, either the pattern to be edited is selected from the list presented in window 235, or a "Not Used" pattern may be selected by the moving the selection arrow 234 to the desired entry, and the select the "Edit" menu area 237. This, as shown in the menu flow chart of FIGS. 7A and 7C, will lead to one of a number of verify selection steps 300–304 (and associated menu screens—not shown). Preferably, although not shown in the figures, an intermediate step that requires entry of a password before going to a Pattern Edit Screen. This ensures that patterns are edited only by those who have the authority to do so. If the password fails, of if the user merely wishes to verify the particulars of the selected pattern, the password request screen (not shown) would then be left in favor of one of three verify screens: Hinge Pattern Verify step 300, Lock Pattern Verify step 302, or Deadbolt Pattern Verify step 304, and the particular menu screens (not shown) with the step.

The Verify screens 300–304 provide information as to the particular aspect of the predetermined pattern selected. For example, the Hinge Verify Pattern menu screen would provide such information as the identification of the pattern, its description, the dimensions, including depth, of the mortise that will be formed in the edge of the door and in the door jamb for the hinge plate. If the pattern is not acceptable, the user can select to return to the Main/Start screen 200A and from there through the Service menu area select to proceed to the Door Pattern Edit step 306 (if the user has the proper password) to select the particular feature of the selected pattern to edit.

Similarly, the Lock Pattern Verify step 302 provides information respecting the particular configuration of the door preparation station has for the selected pattern for door lock preparation. That information would include the dimensions of the holes that will be drilled in the door, their locations, the dimensions and depth of the latch plate, etc., which would be shown for verification. If acceptable, a "Pattern Verify" selection can be made; if not, one may select to return to the Main/Start screen 200A and, if the password is available, go to the edit screen selection step necessary.

A pattern may be edited through the Door Pattern Edit step 306 where information about particular parameters of presently selected for the station 10 are shown. One then may select to modify the hinge pattern by selecting menu areas (not shown) that will lead to a sequence of selection steps 310, 312, and 314 (and associated menu screens—not shown) that provide for modification of the hinge pattern. Alternatively (or in addition thereto), a lock pattern sequence of selection steps 320, 322, 324 allow the lock pattern to be modified, or to selection steps 330, 332, 334 to modify the deadbolt configuration. The modified pattern may now be saved as the same pattern—edited, or it may be saved as an entirely new pattern, by respectively selecting the "Save" or the "Save As . . . " screen areas.

The door preparation station may also be operated manually. Manual operation allows the individual operating pieces of the door preparation station 10 to be exercised for checking its function and operation, or alternatively, a door can be placed or otherwise brought into the station for special preparation. One or more of the individual door preparation tasks (mortises for hinges or lock plates, bore formation for locks, etc. can then be performed separately. This is accomplished by making the "Manual" selection from the service screen step (FIG. 7A) to bring one to the Manual selection step 350 where choices presented as to which assembly or module is desired to be operated. For example, if the butt router module is desired, a menu area (not shown) may allow one to make a selection that leads to the Butt Router Manual selection step 352. There, the butt router module 40 (FIGS. 1 and 4) can be relocated from its presently configured position to reposition the cutting tool it carries, manually, using menu area choices on a menu screen (not shown) associated with the Butt Router Manual selection step 352. Menu choices may allow changing the X and Y axis of the butt router. Or, of the Z-axis of the butt router 40 is desired to be manually changed, the Butt Router z-axis selection step to bring one to the butt router z-axis screen (not shown) for selecting changes in much the same way as they were made with the Butt Router selection step In summary, there has been described an automated door preparation system that includes a door preparation station controlled by a control system that presents sequences of menu selections for quick and easy setup and configuration of the station. The control system may be implemented using a ControlLogix 1756 system programmable logic controller available from Rockwell Automation, 1 Allen-Bradley Drive, Mayfield Heights (ControlLogix is a registered trademark of Allen-Bradley Company, LLC). However, it will be appreciated by those skilled in this art that any similar control mechanism may be used, including a conventional personal computer, which may use a keyboard entry rather than the touch-sensitive screen described above.

What is claimed is:

1. A door preparation station, comprising:

first and second assemblies located in spaced relation for receiving a door, the second assembly being movable toward and away from the first assembly;

a first cutting tool carried by the first assembly operating to form hinge mortises in one edge of the door;

a face machining module carried by the second assembly operating to form lock holes in the door;

an edge machining assembly operating to form a latch bore in the other edge of the door;

a conveyer mechanism for moving a door into working relation with the first cutting tool and the face and edge machining assemblies; and wherein the first assembly is pivotable to orient the first cutting tool at a first angle for forming hinge mortises in the one edge of the door having a bevel and at a second angle for forming hinge mortises in the one edge of the door having no bevel.

2. The door preparation station of claim 1, wherein the first angle is approximately 3 degrees from the second angle.

3. A door preparation station, comprising:

first and second assemblies located in spaced relation for receiving a door, the second assembly being movable toward and away from the first assembly;

a first cutting tool carried by the first assembly operating to form hinge mortises in one edge of the door, the first assembly being pivotal for orienting the first cutting tool at a first angle to form hinge mortises in the one edge of the door having a bevel and for orienting the cutting tool at a second angle to form hinge mortises in the one edge of the door having no bevel;

a face machining module carried by the second assembly operating to form lock holes in the door;

an edge machining assembly operating to form a latch bore in the other edge of the door;

a conveyer mechanism for moving a door into working relation with the first cutting tool and the lock and edge machining assemblies; and processor system, including a display, for providing a series menus to allow an operator to configure and set operation of the door preparation station.

4. The door preparation station of claim 1, wherein the edge machining assembly alternately operates to form a lock pocket in the other edge of the door.

5. A door preparation station, comprising:

first and second assemblies located in spaced relation for receiving a door, the second assembly being movable toward and away from the first assembly;

a first cutting tool carried by the first assembly operating to form hinge mortises in one edge of the door;

a face machining module carried by the second assembly operating to form lock holes in the door;

an edge machining assembly operating to form a latch bore in the other edge of the door;

a conveyer mechanism for moving a door into working relation with the first cutting tool and the face and edge machining assemblies; and the door preparation station of claim 1, including processor means and a display for providing a series of menus to allow an operator to configure and set operation of the door preparation station.

6. A door preparation station, comprising:

first and second assemblies located in spaced relation for receiving a door, the second assembly being movable toward and away from the first assembly;

a first cutting tool carried by the first assembly operating to form hinge mortises in one edge of the door;

a face machining module carried by the second assembly operating to form lock holes in the door;

an edge machining assembly operating to form a latch bore in the other edge of the door; and a conveyer mechanism for moving a door into working relation with the first cutting tool and the face and edge machining assemblies;

wherein the edge machining assembly alternately operates to form a lock pocket in the other edge of the door.

* * * * *